(12) United States Patent
Ohmori et al.

(10) Patent No.: US 8,968,962 B2
(45) Date of Patent: Mar. 3, 2015

(54) SOLID OXIDE FUEL CELL, AND ASSEMBLING METHOD OF THE SAME

(75) Inventors: Makoto Ohmori, Nagoya (JP); Natsumi Shimogawa, Nagoya (JP); Masayuki Shinkai, Ama-Gun (JP); Toshiyuki Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 808 days.

(21) Appl. No.: 12/539,808

(22) Filed: Aug. 12, 2009

(65) Prior Publication Data

US 2010/0055531 A1 Mar. 4, 2010

(30) Foreign Application Priority Data

Aug. 27, 2008 (JP) ................. 2008-217679
May 14, 2009 (JP) ................. 2009-117318

(51) Int. Cl.
*H01M 8/02* (2006.01)
*H01M 8/12* (2006.01)
*H01M 8/24* (2006.01)
*H01M 4/88* (2006.01)

(52) U.S. Cl.
CPC ............ *H01M 8/247* (2013.01); *H01M 4/8882* (2013.01); *H01M 8/0297* (2013.01); *H01M 8/2425* (2013.01); *H01M 2008/1293* (2013.01); *Y02E 60/50* (2013.01); *Y02E 60/525* (2013.01)
USPC ........... 429/495; 429/457; 429/463; 429/465; 429/469; 429/508; 429/535

(58) Field of Classification Search
USPC ......... 429/495, 457, 463, 465, 469, 508, 509, 429/535
See application file for complete search history.

(56) References Cited

U.S. PATENT DOCUMENTS

| 5,175,063 | A | * | 12/1992 | Ishihara et al. | 429/456 |
|---|---|---|---|---|---|
| 5,273,837 | A | * | 12/1993 | Aitken et al. | 429/496 |
| 6,165,634 | A | * | 12/2000 | Krasij et al. | 429/434 |
| 7,323,268 | B2 | | 1/2008 | Robert | |
| 2003/0082434 | A1 | * | 5/2003 | Wang et al. | 429/40 |
| 2005/0074652 | A1 | * | 4/2005 | Choi | 429/32 |
| 2006/0280998 | A1 | * | 12/2006 | Ying et al. | 429/40 |
| 2007/0015035 | A1 | * | 1/2007 | Izenson et al. | 429/38 |

FOREIGN PATENT DOCUMENTS

JP 2004-342584 A1 12/2004

* cited by examiner

*Primary Examiner* — Gregg Cantelmo
(74) *Attorney, Agent, or Firm* — Burr & Brown, PLLC

(57) ABSTRACT

A reduction process is performed to each fuel electrode layer by supplying a reduction gas into each fuel channel 22 in the state in which a perimetric portion of a sheet body 11 is held to be sealed by perimetric portions of an upper support member 122 and a lower support member 121. In the case of a small-sized fuel cell in which the thickness of the sheet body 11 is 20~500 μm, the fuel electrode layer is greater in thickness than the solid electrolyte layer and the air electrode layer, and the area of the orthogonal projection of the plane portion 12a of each support member 12 is 1~100 cm$^2$, a ratio of a warpage of not more than 0.05 cm$^{-1}$ on the sheet body with respect to the area of the orthogonal projection can be achieved at room temperature after the reduction process.

12 Claims, 8 Drawing Sheets

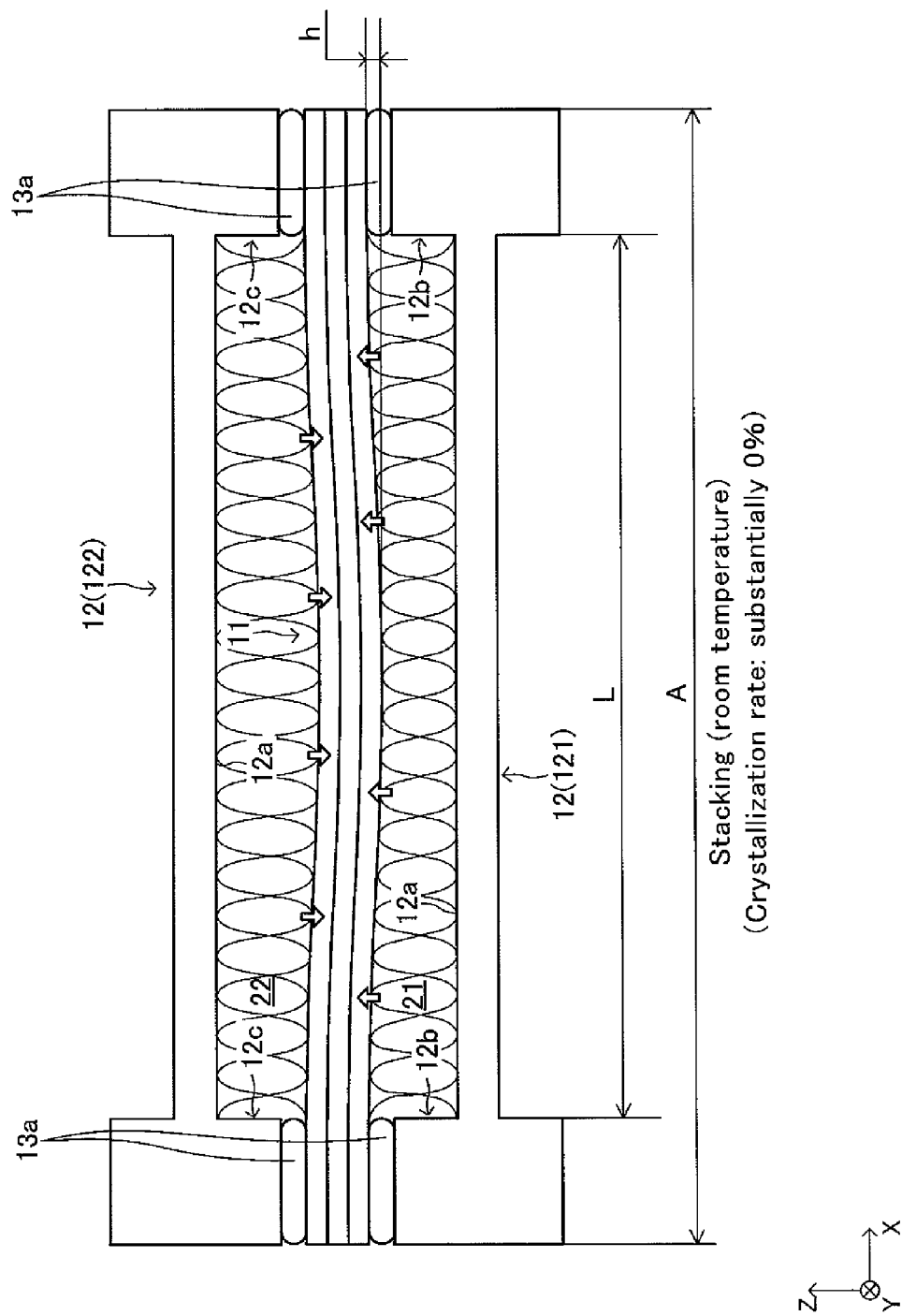

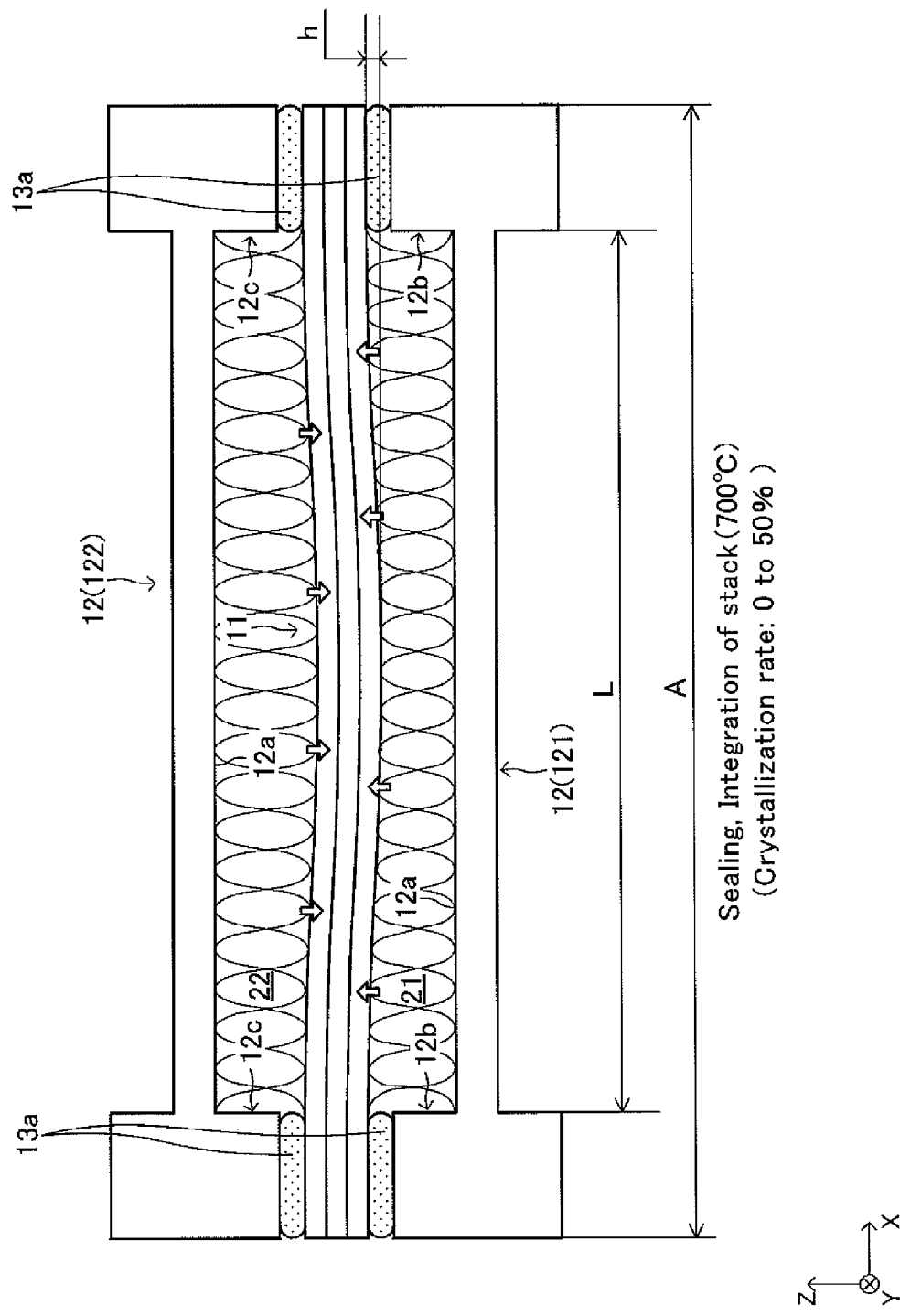

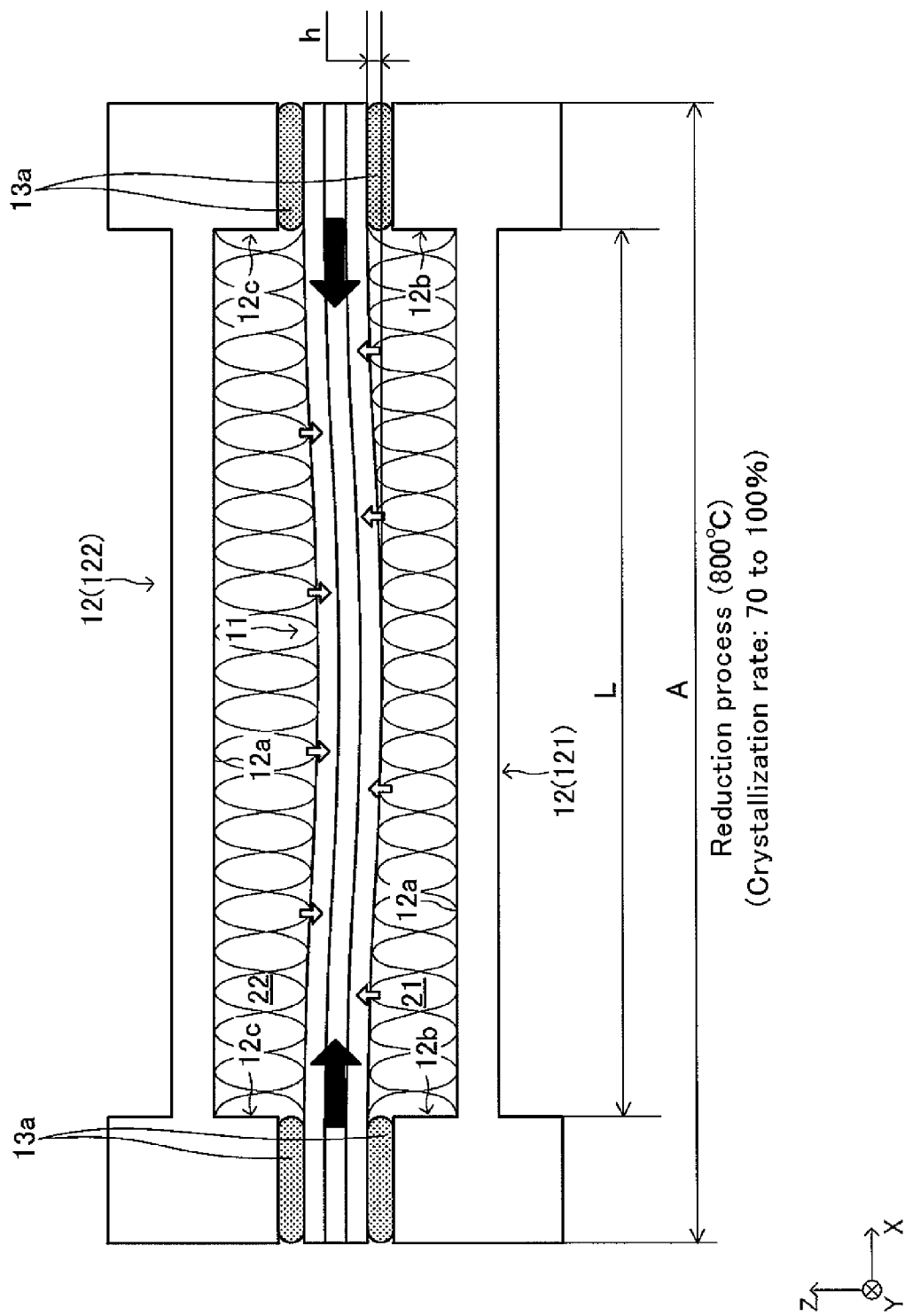

SOLID OXIDE FUEL CELL, AND ASSEMBLING METHOD OF THE SAME

BACKGROUND OF THE INVENTION

1. Field of the Invention

The present invention relates to a solid oxide fuel cell (SOFC), and an assembling method of the same, and particularly to an SOFC having a (flat-plate) stack structure in which sheet bodies and support members are stacked in alternating layers, and an assembling method of the same.

2. Description of the Related Art

Conventionally, a solid oxide fuel cell having the above-mentioned stack structure has been known (refer to, for example, Japanese Patent Application Laid-Open (kokai) No. 2004-342584). In this case, the sheet body (may also be referred to as "single cell") can be a fired body having a flat plate shape in which a solid electrolyte layer formed from zirconia, a fuel electrode layer, and an air electrode layer are arranged in layers such that the fuel electrode layer is formed on the upper surface of the solid electrolyte layer and such that the air electrode layer is formed on the lower surface of the solid electrolyte layer. For each sheet body, the support member (may also be referred to as a "separator") adjacent to the upper side of the sheet body is also referred to as an "upper support member", and the support member adjacent to the lower side of the sheet body is also referred to as a "lower support member".

For each sheet body, the perimetric portion of the sheet body is held to be sealed by the lower surface of the perimetric portion of the upper support member and the upper surface of the perimetric portion of the lower support member, so that a fuel channel through which a fuel gas flows is formed and defined in a space between the lower surface of a plane portion, which is positioned at the inner side of the perimetric portion of the upper support member, and the upper surface of the fuel electrode layer of the sheet body. Further, an air channel through which a gas (air) containing oxygen flows is formed and defined in a space between the upper surface of the plane portion, which is located at the inner side from the perimetric portion of the lower support member, and the lower surface of the air electrode layer of the sheet body.

In the structure described above, a fuel gas is supplied to the fuel channel and air is supplied to the air channel with the temperature of the SOFC being raised and heated to a working temperature (e.g., 800° C., hereinafter merely referred to as the "working temperature") of the SOFC. Thus, the fuel gas and air are brought into contact with the upper surface and the lower surface of each of the sheet bodies respectively, whereby electricity generating reaction is produced for each sheet body.

SUMMARY OF THE INVENTION

When the fired body is used as the sheet body as described above, a reduction process has to be performed to the fuel electrode layer of the fired sheet body in order to make the fuel electrode layer function as a fuel electrode (anode electrode) of the SOFC. The reduction process is executed by supplying a reduction gas (e.g., hydrogen) to the surface of the fuel electrode layer. In this case, it is necessary to take a measure for preventing the reduction gas from being supplied to the surface of the air electrode layer. This is because, when the reduction gas is supplied to the air electrode layer, the material constituting the air electrode layer is decomposed, with the result that the function as the air electrode cannot be achieved.

When the reduction process is executed to the fuel electrode layer of a solitary sheet body before the stacking, the sheet body (particularly, the central part of the sheet body) is greatly deformed (warped) in the direction in which the surface where the fuel electrode layer is present becomes concave, due to the contraction of the fuel electrode layer. In recent years, an attempt has been made to greatly reduce the size of the sheet body in order to downsize the SOFC or reduce the internal electrical resistance. When the sheet body is extremely thin, the warpage of the sheet body caused by the reduction process becomes noticeable in particular. For example, when the reduction process is executed to the fuel electrode layer of a sheet body, which is in a state of a solitary sheet body having a shape of a square having one side of 3 cm as viewed in plane, the height of the warpage in the direction vertical to the plane of the sheet body becomes very large, such as not less than 3 mm, under room temperature after the reduction process.

When the stack structure is assembled with the use of the sheet body that is greatly warped in the direction in which the surface where the fuel electrode layer is present becomes concave, various problems arise, the problems including the case in which it is difficult to assemble the stack, the case in which the air channel is reduced, so that the pressure loss generated when air flows through the air channel increase, or the like.

Further, when the reduction process is executed to the fuel electrode layer of a solitary sheet body before the stacking, it becomes necessary to take a measure for preventing the reduction gas from being supplied to the surface of the air electrode layer.

Accordingly, an object of the present invention is to provide a small-sized SOFC having a (flat-plate) structure in which sheet bodies, each of which is a fired body including a solid electrolyte layer, a fuel electrode layer, and an air electrode layer, and support members are stacked in alternating layers, wherein warpage generated on the sheet body when a reduction process is performed to the fuel electrode layer of the fired sheet body can be suppressed.

In order to attain the foregoing object, an SOFC according to the present invention includes a single or a plurality of sheet bodies that has a solid electrolyte layer, a fuel electrode layer formed on the upper surface of the solid electrolyte layer, and an air electrode layer formed on the lower surface of the solid electrolyte layer, these layers being stacked and fired, and a plurality of support members for supporting the single or the plurality of sheet bodies, wherein the sheet bodies and the support members are stacked in alternating layers. For each sheet body, the upper surface of the perimetric portion of the sheet body and the lower surface of the perimetric portion of the upper support member, as well as the lower surface of the perimetric portion of the sheet body and the upper surface of the perimetric portion of the lower support member are respectively sealed in order that the perimetric portion of the sheet body is held between the lower surface of the perimetric portion of the upper support member and the upper surface of the perimetric portion of the lower support member. Further, for each sheet body, a fuel channel through which a fuel gas is supplied is defined and formed in a space formed between a lower surface of a plane portion located at the inner side from the perimetric portion of the upper support member and the upper surface of the fuel electrode layer in the sheet body, and an air channel through which a gas containing oxygen is supplied is defined and formed in a space formed between the upper surface of the plane portion located at the inner side from the perimetric portion of the lower support member and the lower surface of the air electrode layer in the sheet body.

In the SOFC according to the present invention, from the viewpoint of downsizing the reactor as a whole, it is preferable that the thickness of each sheet body is 20 μm or more and 500 μm or less, and the area of the orthogonal projection (the area of the plane portion as viewed in plane) of the plane portion of the support member with respect to the direction perpendicular to the plane of the sheet body is 1 cm$^2$ or more and 100 cm$^2$ or less. Specifically, the shape of the orthogonal projection of the plane portion of the support member is formed into a circle, ellipse, square, or rectangle, and the diameter of the circle, the major axis of the ellipse, one length of the square, or the length of the long side of the rectangle is 1 cm or more and 10 cm or less.

In the SOFC according to the present invention, the thickness of the fuel electrode layer is greater than the thickness of the solid electrolyte layer and the thickness of the air electrode layer. Specifically, the rigidity of the fuel electrode layer is the greatest among the three layers, so that the fuel electrode layer can serve as a support layer of the sheet body. In the comparison of the thickness of each layer, the "thickness" of the layer indicates the average, the minimum value, or the like in the variation in the local thickness of the layer. It is preferable that the thickness of each layer is uniform all over the layer. It is also preferable that the thickness of each sheet body is uniform all over.

The feature of the SOFC according to the present invention is such that a warpage ratio (=(height of warpage)/(area of orthogonal projection of plane portion)), which is a ratio of the height of the warpage (hereinafter merely referred to as "warpage height") of the sheet body to the area of the orthogonal projection of the plane portion is 0.05 cm$^{-1}$ or less, under room temperature after the execution of the reduction process to each of the fuel electrode layers. The warpage height means the height of the warpage in the direction perpendicular to the plane at the central part with respect to the perimetric portion of the sheet body, for example. When the reduction process is executed to the fuel electrode layer of a sheet body, which is in a state of a solitary sheet body that is extremely thin before the stacking, the warpage ratio under the room temperature after the reduction process is remarkably great with respect to 0.05 cm$^{-1}$. Accordingly, "the warpage ratio of 0.05 cm$^{-1}$ or less at room temperature after the reduction process" cannot be achieved when the reduction process is executed in the state of the solitary sheet body that is extremely thin before the stacking.

The present inventors have found that, when the reduction process to each fuel electrode layer is executed by supplying a reduction gas into the fuel channel, in the state in which the perimetric portion of each sheet body is held and sealed by the lower surface of the perimetric portion of the upper support member and the upper surface of the perimetric portion of the lower support member, under the conditions in which the thickness of each sheet body is extremely thin such as 20 μm or more and 500 μm or less, the thickness of the fuel electrode layer is greater than the thickness of the solid electrolyte layer and the thickness of the air electrode layer, and the area of the orthogonal projection of the plane portion of each support member is 1 cm$^2$ or more and 100 cm$^2$ or less, "the warpage ratio of 0.05 cm$^{-1}$ or less at room temperature after the reduction process" can be achieved. It is considered that this is based upon the operation in which the action for inhibiting the progression of the warpage on the sheet body caused by the contraction of the fuel electrode layer due to the reduction process is strongly exerted since the perimetric portion of the sheet body is restrained (to some degree) by the "holding" and "sealing" described above under the above-mentioned conditions.

It is added below about the reduction of the warpage (flattening) of the sheet body because of the execution of the reduction process to the fuel electrode layer in the state in which the perimetric portion of the sheet body is restrained to some degree. When the fuel electrode layer serves as the support layer of the sheet body, strain stress is generally produced on the sheet body due to the difference in the temperature at which the firing is started among the layers, the difference in the contraction and expansion amount during the firing among the layers, and the difference in the thermal expansion coefficient among the layers, upon the firing. When the sheet body is extremely thin, the warpage is inevitably produced on the sheet body due to the strain stress. It has been found that, when the reduction process is performed to the fuel electrode layer in the state in which the perimetric portion of each fired sheet body, which is extremely thin and has already been warped, is restrained to some degree, a sheet body (having high flatness) having extremely small warpage ratio at room temperature can be obtained. This is considered that it is based upon the operation in which, during the process of reducing and firing an oxide (nickel oxide, etc.) in the fuel electrode layer, the extremely thin sheet body is transformed with plastic strain. When the temperature of the stack having high temperature after the reduction process is lowered in a neutral atmosphere (in order not to reoxidize the sheet body), then, the resultant is collected, and then, a part of the support member (separator) is cut to observe each sheet body in which the perimetric portion thereof is restrained, the warpage at room temperature is reduced (compared to the fired sheet body before the reduction process). Even when the bonding portion between the perimetric portion of each sheet body and the adjacent support member is cut by a laser process so as to collect each sheet body with a solitary state, the state in which the warpage is reduced at room temperature can be maintained. From the above, it is considered that the extremely thin sheet body is plastic-deformed during the reduction process.

After the sealing step is completed, the fuel channel and the air channel are airtightly defined with the seal material. Accordingly, when the reduction gas is supplied to the fuel channel for performing the reduction process after the completion of the sealing step, the supply of the reduction gas to the surface of the air electrode layer can be prevented without taking a special measure for preventing the supply of the reduction gas to the surface of the air electrode layer.

Further, when, for each sheet body, a current-collecting member for securing an electrical connection between the support member and the sheet body adjacent to the support member is confined in the corresponding fuel channel and the air channel in such a manner that each of the current-collecting members has an elasticity in the direction perpendicular to the plane of the sheet body, and the elasticity in the direction in which the support member and the sheet body adjacent to the support member are separated from each other in the perpendicular direction is produced, the present inventors have found that, if the elastic coefficient relating to the elasticity of the current-collecting member is 0.1 to 8 N/μm, the electrical connection between the support member and the sheet body adjacent to the support member is surely secured, the generation of cracks on the sheet body during the reduction process can be suppressed, and "the warpage ratio at room temperature after the reduction process" can be reduced.

In order to attain the above-mentioned "warpage ratio of not more than 0.05 cm$^{-1}$ at room temperature after the reduction process", the assembling method of an SOFC according to the present invention is applied under the condition in which the thickness of each sheet body is extremely thin such as 20 μm or more and 500 μm or less, the thickness of the fuel electrode layer is greater than the thickness of the solid electrolyte layer and the thickness of the air electrode layer, and the area of the orthogonal projection of the plane portion of each support member is 1 cm$^2$ or more and 100 cm$^2$ or less, the method including a stacking/sealing step in which the sheet bodies and the support members are stacked in alternating layers with a seal material interposed between the perimetric portion of each of the sheet bodies and the perimetric portion of each of the support members adjacent to the sheet body, and the perimetric portion of the sheet body is held to be sealed by the lower surface of the perimetric portion of the upper support member and the upper surface of the perimetric portion of the lower support member; and a reduction process step in which a reduction gas is supplied into each of fuel channels, which are formed and defined in the laminate to which the sealing is performed, in order to perform a reduction process to each of the fuel electrode layers.

Thus, as described above, "warpage ratio of not more than 0.05 cm$^{-1}$ at room temperature after the reduction process" can be achieved, since the reduction process is executed in the state in which the perimetric portion of each sheet body is restrained (to some degree) by the "holding" and "sealing".

It is preferable that, in the stacking/sealing step, a current-collecting member for securing an electrical connection between the support member and the sheet body, which are adjacent to each other, in the space between the sheet body and the support member, which are adjacent to each other, corresponding to the fuel channel and the air channel, in order to secure the electrical connection between the support member and the sheet body.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 6 is a schematic view, corresponding to FIG. 4, showing, with exaggeration, the surrounding of the seal material of the fuel cell shown in FIG. 1 in a stacking step;

FIG. 7 is a schematic view, corresponding to FIG. 4, showing, with exaggeration, the surrounding of the seal material of the fuel cell shown in FIG. 1 in a sealing step; and FIG. 8 is a schematic view, corresponding to FIG. 4, showing, with exaggeration, the surrounding of the seal material of the fuel cell shown in FIG. 1 in a reduction process step.

DETAILED DESCRIPTION OF THE INVENTION

A solid oxide fuel cell according to an embodiment of the present invention will next be described with reference to the drawings.

Figure 1:
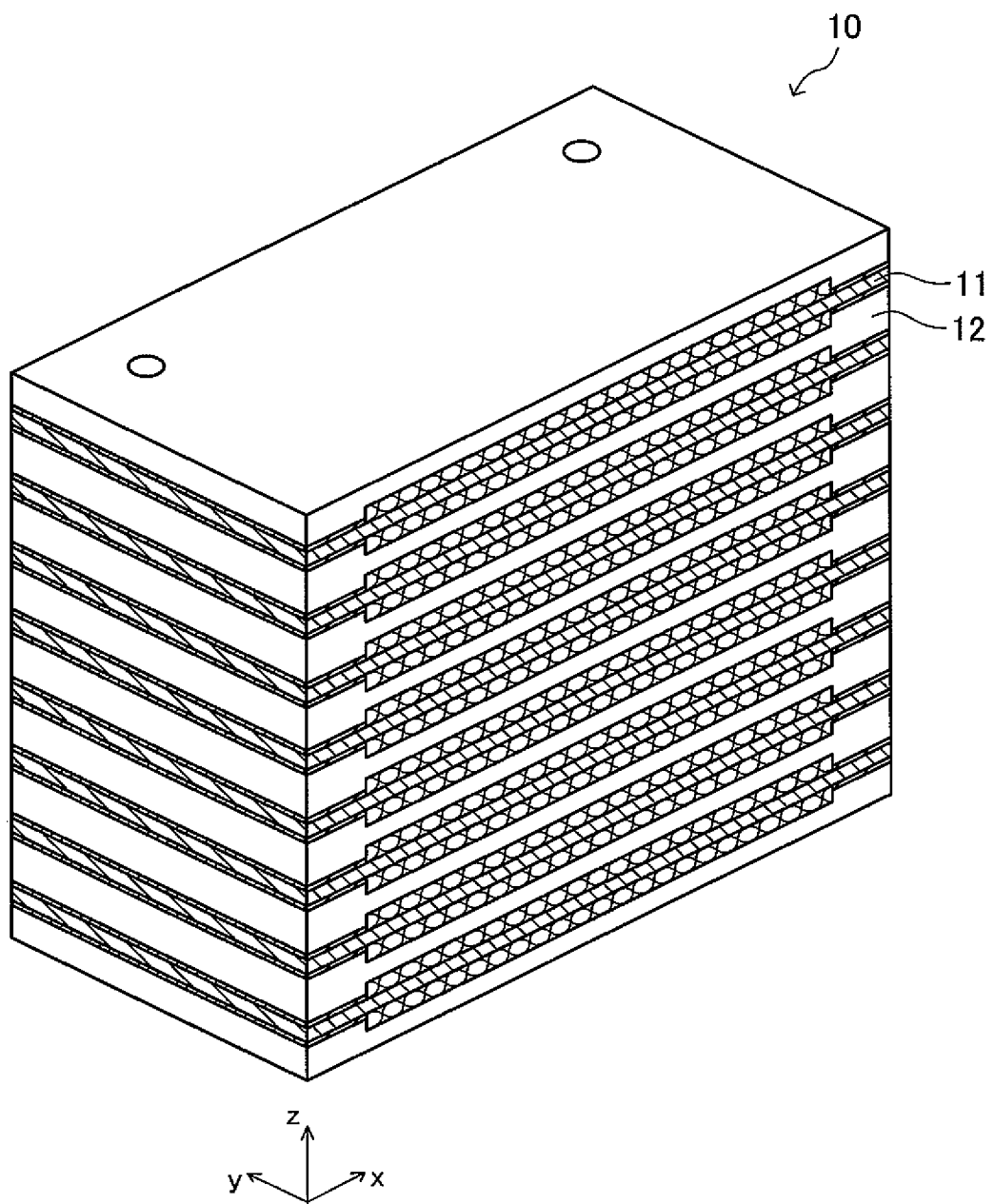
FIG. 1 is a cutaway perspective view of a solid oxide fuel cell according to an embodiment of the present invention.
Figure 2:
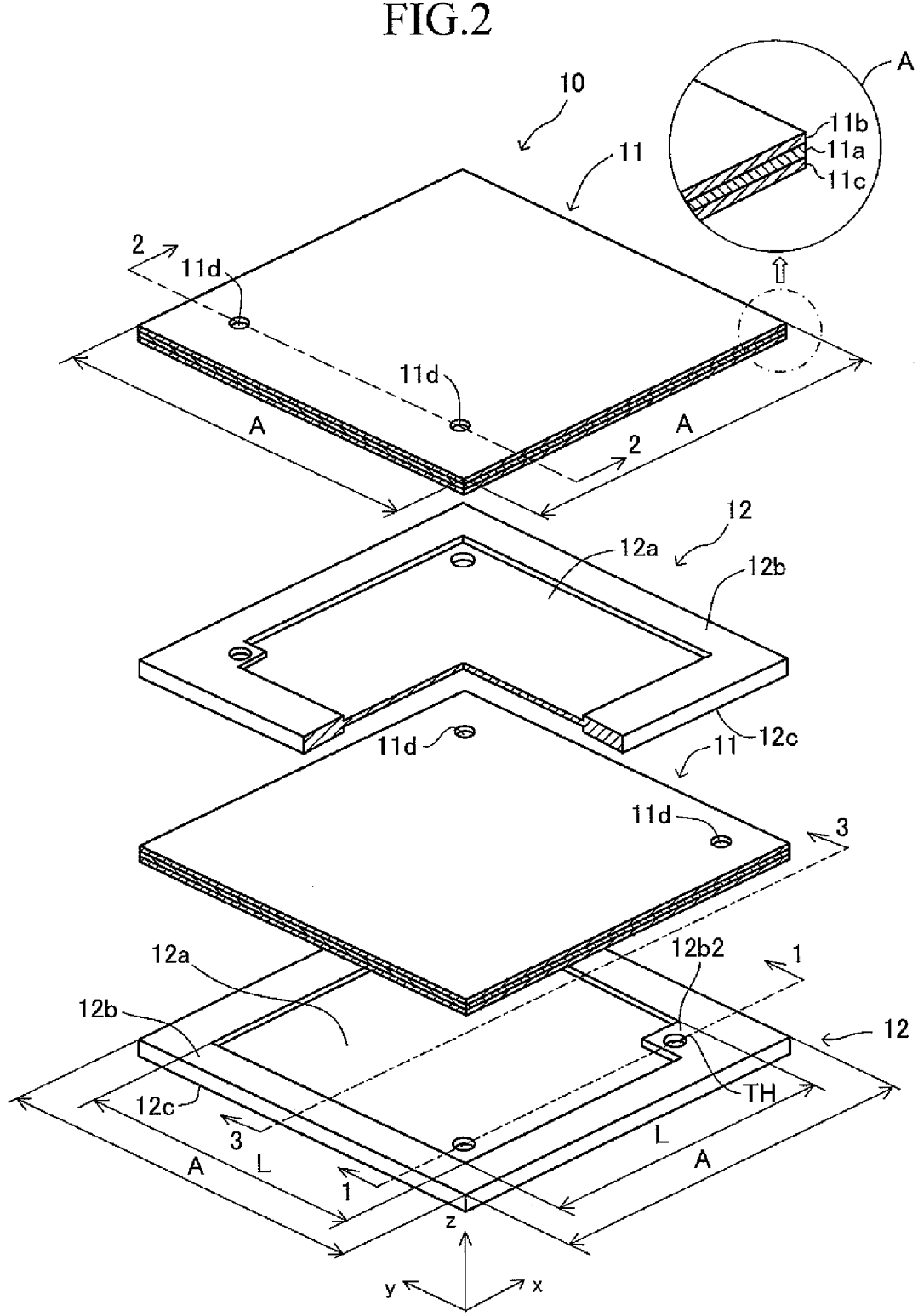
FIG. 2 is an exploded partial perspective view of the fuel cell shown in FIG. 1.

Overall Structure of Fuel Cell:

FIG. 1 perspectively shows, in a cutaway fashion, a solid oxide fuel cell (hereinafter, referred to merely as the "fuel cell") 10, which is a device according to an embodiment of the present invention. FIG. 2 perspectively and partially shows, in an exploded fashion, the fuel cell 10. The fuel cell 10 is configured such that sheet bodies 11 and support members 12 are stacked in alternating layers. That is, the fuel cell 10 has a flat-plate stack structure. The sheet body 11 is also referred to as a "single cell" of the fuel cell 10. The support member 12 is also referred to as a "separator".

As shown on an enlarged scale within a circle A of FIG. 2, the sheet body 11 is a fired body having an electrolyte layer (solid electrolyte layer) 11a, a fuel electrode layer 11b formed on the electrolyte layer 11a (on the upper surface of the electrolyte layer 11a), and an air electrode layer 11c formed on a side of the electrolyte layer 11a opposite the fuel electrode layer 11b (on the lower surface of the electrolyte layer 11a). The planar shape of the sheet body 11 is a square having sides (length of one side=A) extending along mutually orthogonal x- and y-axes. The sheet body 11 is a plate member (thickness=t1) having a thickness along a z-axis orthogonal to the x-axis and the y-axis.

In the present embodiment, the electrolyte layer 11a is a dense fired body of YSZ (yttria-stabilized zirconia). The fuel electrode layer 11b is a fired body of Ni—YSZ (the fired body is a state after the later-described reduction process. It is a fired body of NiO—YSZ before the reduction process), and a porous electrode layer. The air electrode layer 11c is a fired body of LSCF (lanthanum strontium cobalt ferrite) and a porous electrode layer. The electrolyte layer 11a, the fuel electrode layer 11b, and the air electrode layer 11c have different room-temperature-to-1000° C. mean thermal expansion coefficients of about 10.8 ppm/K, 12.5 ppm/K, and 11.5 ppm/K, respectively.

The sheet body 11 has a pair of cell through-holes 11d. Each of the cell through-holes 11d extends through the electrolyte layer 11a, the fuel electrode layer 11b, and the air electrode layer 11c. The paired cell through-holes 11d are formed in the vicinity of one side of the sheet body 11 and in the vicinity of corresponding opposite ends of the side.

Figure 3:
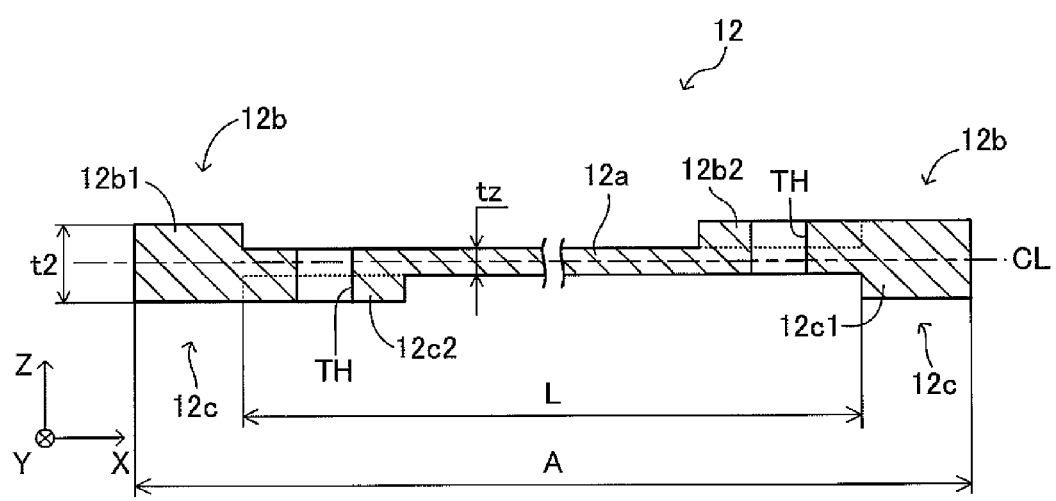
FIG. 3 is a sectional view of a support member taken along a plane that includes line 1-1 of FIG. 2 and is in parallel with an x-z plane.

FIG. 3 is a sectional view of the support member 12 taken along a plane that includes line 1-1 of FIG. 2 parallel with the x-axis and is in parallel with the x-z plane. As shown in FIGS. 2 and 3, the support member 12 includes a plane portion 12a, an upper frame portion 12b (perimetric portion), and a lower frame portion 12c (perimetric portion). The planar shape of the support member 12 is a square having sides (length of one side=A) extending along the mutually orthogonal x- and y-axes. The thickness of the plane portion 12a is tz, and the thickness of the "frame portion" (perimetric portion) is t2 (>tz).

The support member 12 is formed from a Ni-based heat-resistant alloy (e.g., ferritic SUS, INCONEL 600, or HASTELLOY). The support member 12 formed from, for example, SUS 430, which is a ferritic SUS, has a room-temperature-to-1000° C. mean thermal expansion coefficient of about 12.5 ppm/K. Thus, the thermal expansion coefficient of the support member 12 is higher than the mean thermal expansion coefficient of the sheet body 11. Therefore, when the temperature of the fuel cell 10 changes, the difference in the amount of expansion and contraction is produced between the sheet body 11 and the support member 12.

The plane portion 12a is a thin, flat body having a thickness along the z-axis. The planar shape of the plane portion 12a is a square having sides (length of one side=L (<A)) extending along the x-axis and the y-axis.

The upper frame portion 12b is a frame body provided around the plane portion 12a (in a region in the vicinity of the four sides of the plane portion 12a; i.e., an outer peripheral region of the plane portion 12a) in an upwardly projecting condition. The upper frame portion 12b consists of a perimetric frame portion 12b1 and a jutting portion 12b2.

The perimetric frame portion 12b1 is located on a side toward the perimeter of the support member 12. The vertical section of the perimetric frame portion 12b1 (e.g., a section of the perimetric frame portion 12b1 whose longitudinal direction coincides with the direction of the y-axis, taken along a plane parallel with the x-z plane) assumes a rectangular shape (or a square shape).

The jutting portion 12b2 juts toward the center of the support member 12 from the inner peripheral surface of the perimetric frame portion 12b1 at one of four corner portions of the plane portion 12a. The lower surface of the jutting portion 12b2 is integral with the plane portion 12a. The shape of the jutting portion 12b2 as viewed in plane is generally square. The upper surface (plane surface) of the jutting portion 12b2 is continuous with the upper surface (plane surface) of the perimetric portion 12b1. The jutting portion 12b2 has a through-hole TH formed therein. The through-hole TH also extends through a portion of the plane portion 12a that is located under the jutting portion 12b2.

The lower frame portion 12c is a frame body provided around the plane portion 12a (in a region in the vicinity of the four sides of the plane portion 12a; i.e., an outer peripheral region of the plane portion 12a) in a downwardly projecting condition. The lower frame portion 12c is symmetrical with the upper frame portion 12b with respect to a centerline CL that halves the thickness of the plane portion 12a. Accordingly, the lower frame portion 12c has a perimetric frame portion 12c1 and a jutting portion 12c2 that are identical in shape with the perimetric frame portion 12b1 and the jutting portion 12b2, respectively. However, the jutting portion 12c2 is formed at the plane portion 12a in such a manner as to be diagonally opposite the jutting portion 12b2 as viewed in plane.

Figure 4:
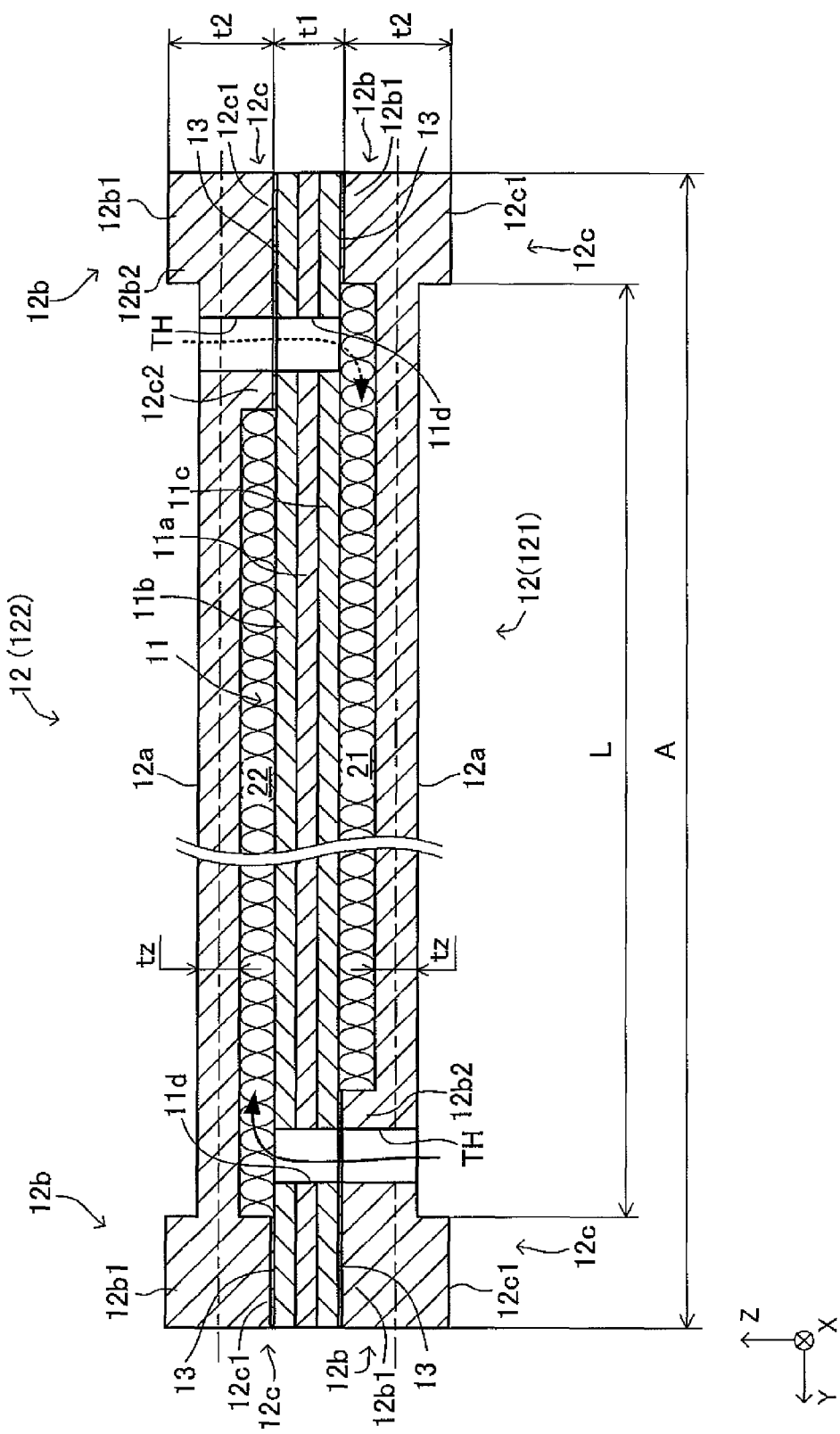
FIG. 4 is a vertical sectional view of the sheet body and the support member, which holds the sheet body, shown in FIG. 1, taken along a plane that includes line 2-2 of FIG. 2 and is in parallel with a y-z plane.

FIG. 4 is a vertical sectional view of the sheet body 11 and a pair of the support members 12 in a state of supporting (holding) the sheet body 11 therebetween, the sectional view being taken along a plane that includes line 2-2 of FIG. 2 parallel with the y-axis and is in parallel with the y-z plane. As described previously, the fuel cell 10 is formed by stacking the sheet bodies 11 and the separators 12 in alternating layers.

For convenience of description, of the paired support members 12, the support member 12 adjacent to the lower side of the sheet body 11 is referred to as a lower support member 121, and the support member 12 adjacent to the upper side of the sheet body 11 is referred to as an upper support member 122. As shown in FIG. 4, the lower support member 121 and the upper support member 122 are coaxially arranged such that the lower frame portion 12c of the upper support member 122 is located above the upper frame portion 12b of the lower support member 121 in a mutually facing manner.

The entire perimetric portion of the sheet body 11 is sandwiched between the upper frame portion 12b (perimetric portion) of the lower support member 121 and the lower frame portion 12c (perimetric portion) of the upper support member 122. At this time, the sheet body 11 is arranged such that the air electrode layer 11c faces the upper surface of the plane portion 12a of the lower support member 121 and such that the fuel electrode layer 11b faces the lower surface of the plane portion 12a of the upper support member 122.

The entire perimetric portion of the sheet body 11 and the entire perimetric portion of the upper frame portion 12b of the lower support member 121, as well as the entire perimetric portion of the sheet body 11 and the entire perimetric portion of the lower frame member 12c of the upper support member 122, are sealed (bonded) to one another, whereby they are fixed to each another so as to make the relative movement impossible. A crystallized glass (may have an amorphous region left) is used as the seal material 13. During the assembly of the fuel cell 10, the crystallization ratio of the crystallized glass is stepwisely adjusted. This will be described later.

Thus, as shown in FIG. 4, the upper surface of the plane portion 12a of the lower support member 121, the inner wall surface of the upper frame portion 12b (the perimetric frame portion 12b1 and the jutting portion 12b2) of the lower support member 121, and the lower surface of the air electrode layer 11c of the sheet body 11 define an air channel 21 through which a gas containing oxygen (air) flows. The gas containing oxygen flows into the air channel 21 through the through-hole TH of the upper support member 122 and the cell through-hole 11d of the sheet body 11 as indicated by an arrow of a broken line in FIG. 4.

Similarly, the lower surface of the plane portion 12a of the upper support member 122, the inner wall surface of the lower frame portion 12c (the perimetric frame portion 12c1 and the jutting portion 12c2) of the upper support member 122, and the upper surface of the fuel electrode layer 11b of the sheet body 11 define a fuel channel 22 through which a fuel containing hydrogen flows. The fuel flows into the fuel channel 22 through the through-hole TH of the lower separator 121 and the cell through-hole 11d of the sheet body 11 as indicated by an arrow of a solid line in FIG. 4.

As shown in FIG. 4, metal meshes (e.g., metal meshes having an emboss structure) for current collection are confined in the air channel 21 and the fuel channel 22. Each of the metal meshes has elasticity in the stacking direction. Further, each of the metal meshes is confined in such a manner that elastic force in the direction in which the corresponding support member 12 and the sheet body 11 are separated from each other in the stacking direction is generated (i.e., in such a manner that a preload is generated).

By virtue of this structure, the electrical connection between the lower support member 121 and the sheet body 11 and the electrical connection between the upper support member 122 and the sheet body 11 can be secured. Further, since the metal mesh is confined, the flow channel of a gas is restricted. As a result, the area (circulation area), viewed from the plane, where the electricity-generating reaction can substantially be produced due to the circulation of the gas can be increased in the air channel 21 and the fuel channel 22, whereby the electricity-generating reaction can effectively be generated in the sheet body 11.

Figure 5:
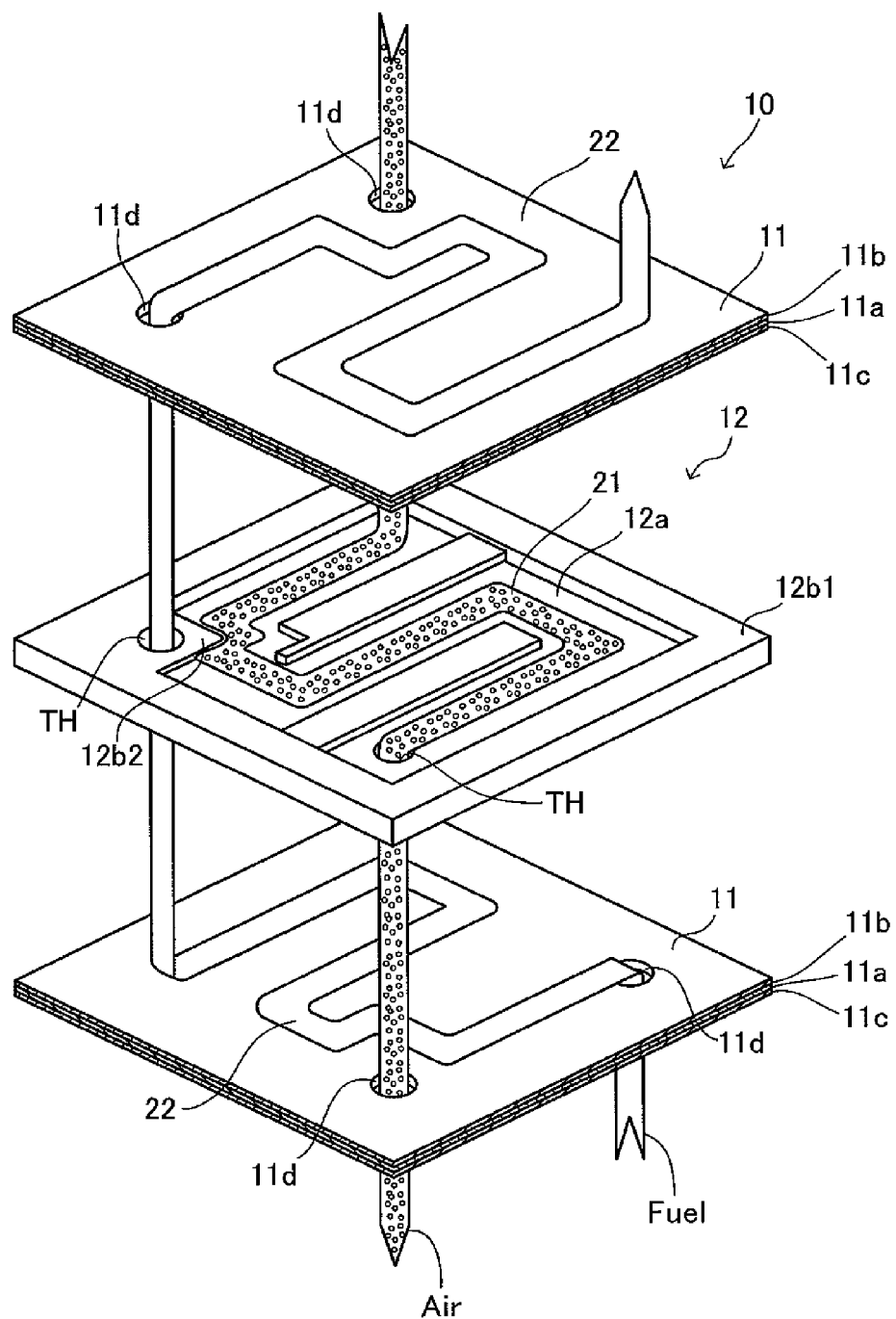
FIG. 5 is a view for explaining a circulation of fuel and air in the fuel cell shown in FIG. 1.

In the thus-configured fuel cell 10, as shown in FIG. 5, the fuel is supplied to the fuel channel 22 formed between the fuel electrode layer 11b of the sheet body 11 and the lower surface of the plane portion 12a of the support member 12, while air is supplied to the air channel 21 formed between the air electrode layer 11c of the sheet body 11 and the upper surface of the plane portion 12a of the support member 12, whereby electricity is generated while utilizing the chemical reactions expressed below by Formulas (1) and (2).

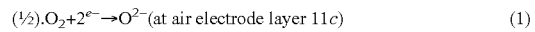  (1)

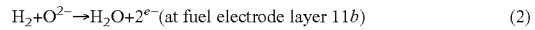  (2)

Since the fuel cell (SOFC) 10 utilizes oxygen conductivity of the solid electrolyte layer 11a for generating electricity, the working temperature of the fuel cell 10 is generally 600° C. or higher. Accordingly, the temperature of the fuel cell 10 is raised from room temperature to the working temperature (e.g., 800° C.) by means of an external heating mechanism (e.g., a heating mechanism that uses a resistance heater or a heating mechanism that utilizes heat generated through combustion of a fuel gas).

The length of one side A of the planar shape (=square) of the sheet body 11 (accordingly, the support member 12) is 1.1 cm or more and 11 cm or less in the present embodiment. The thickness t1 of the sheet body 11 is uniform all over. In the present embodiment, the thickness t1 is 20 μm or more and 500 μm or less. The thickness of the fuel electrode layer 11b is greater than the thickness of the solid electrolyte layer 11a and the thickness of the air electrode layer 11c. Specifically, the rigidity of the fuel electrode layer 11b is the greatest among three layers, so that the fuel electrode layer 11b can serve as a support layer of the sheet body 11. For example, the thickness of the electrolyte layer 11a is 1 μm or more and 50 μm or less, the thickness of the fuel electrode layer 11b is 5 μm or more and 500 μm or less, and the thickness of the air electrode layer 11c is 5 μm or more and 200 μm or less.

The length L of one side of the planar shape (=square) of the plane portion 12a of the support member 12 is 1 cm or more and 10 cm or less in the present embodiment. The width ((A−L)/2) of the "frame portion" (perimetric portion) of the support member 12 is 0.05 cm or more and 0.5 cm or less. Accordingly, the area of the plane portion 12a of the support member 12 as viewed in plane is 1 cm$^2$ or more and 100 cm$^2$ or less. The thickness t2 of the "frame portion" (perimetric portion) of the support member 12 is 200 μm or more and 1000 μm or less. The thickness tz of the plane portion 12a of the support member 12 is 50 μm or more and 100 μm or less.
Assembly of Fuel Cell, and Reduction Process to Fuel Electrode Layer Next, one example of a method of assembling the fuel cell 10, and one example of a reduction process to the fuel electrode layer 11b will be described.

Firstly, the manufacture of the sheet body 11 used for the assembly of the fuel cell 10 will be described. Firstly explained is the case in which the sheet body 11 is a fuel-electrode-support-type (the fuel electrode layer serves as a support substrate). A sheet (that is to become the fuel electrode layer 11b) made of NiO and YSZ is firstly prepared. Then, a ceramic sheet (YSZ tape) prepared by a green sheet process is laminated on the lower surface of the sheet. The resultant laminate is fired at 1400° C. for one hour. Subsequently, a sheet (that is to become the air electrode layer 11c) is formed by a printing process on the lower surface of the resultant laminate (fired body), and the resultant laminate is fired at 850° C. for one hour. Thus, the sheet body 10 (before the reduction process) is formed. In this case, instead of using the YSZ tape, a ceramic sheet may be formed by a printing process on the lower surface of the sheet (that is to become the fuel electrode layer 11b) made of NiO and YSZ. Further, a celia layer (CeO$_2$) serving as a reaction preventing layer may be formed between the electrolyte layer and the air electrode layer. Further, zircon having small thermal expansion coefficient may be added to the fuel electrode layer. By virtue of the addition of zircon, the mean thermal expansion coefficient of the fuel electrode layer is reduced, whereby the difference in the thermal expansion coefficient between the fuel electrode layer and the air electrode layer can be reduced. As a result, the warpage on the sheet body caused by the difference in thermal expansion coefficient between the layers in the sheet body can be reduced.

The support member 12 used for the assembly of the fuel cell 10 can be formed by etching or cutting.

After the necessary number of the sheet body 10 and the support member 12 are prepared as described above, the assembly of the fuel cell 10 progresses as described below. The assembly of the fuel cell 10 will be described with reference to FIGS. 6 to 8. FIGS. 6 to 8 are vertical sectional schematic views of the sheet body 11 and a pair of support members 12, which supports (holds) the sheet body 11, taken along a plane that includes line 3-3 of FIG. 2 and is in parallel with a x-z plane. The line 3-3 passes the center (=the center of the planar shape (=square) of the sheet body 11) of the planar shape (=square) of the support member 12. In FIGS. 6 to 8, the shape (particularly, thickness, etc.) of the seal material 13 is illustrated with exaggeration for easy understanding of the seal material 13.

The case in which the sheet body 11 is not deformed has been described so far. However, in actuality, the central part of the fired sheet body 11 (and before the reduction process) tends to warp in the downward direction (i.e., in the direction in which the surface where the fuel electrode layer 11b is present becomes concave) at room temperature with a solitary state as shown in FIGS. 6 to 8, because of the sheet body 11 being extremely thin, and because of the difference in the thermal expansion coefficient among three layers constituting the sheet body 11. As shown in FIGS. 6 to 8, the warpage height at the central part in the stacking direction with respect to the perimetric portion of the sheet body 11 is referred to as "warpage height h" below. The ratio of the warpage height h to the area of the plane portion 12a of the support member 12 as viewed in plane is referred to as "warpage ratio" below. The warpage height h can be measured through the observation of the section of the sheet body 11 as viewed from the side, for example.
<Stacking Step>

Firstly, a crystallized glass material (e.g., slurry of borosilicate crystallized glass) that is to become the seal material 13 is applied to each of the support members 12 at regions of its perimetric portion that comes into contact with respective sheet bodies 11 for holding the sheet bodies 11 (i.e., the glass material is applied to the lower surface of the lower frame portion 12c, to the upper surface of the upper frame portion 12b, and to the upper and lower surfaces of the perimetric portion of the support member 12) at room temperature. Alternatively, a crystallized glass material (e.g., slurry of borosilicate crystallized glass) that is to become the seal material 13 may be applied to each of the sheet bodies 11 at regions of its perimetric portion that is held by the upper and lower support members 12 (i.e., the glass material may be applied to the upper and the lower surfaces of the perimetric portion of the sheet body 11) at room temperature. In this embodiment, the crystallization peak temperature of the crystallized glass is 850° C., and the softening point thereof is 650° C. The crystallization rate of the crystallized glass at this stage is 0%. The crystallization rate is a ratio of presence (volume percent) of the crystalline region in the crystallized glass material. The crystallization rate of the crystallized glass, which is a subject to be measured, can be measured by utilizing a diffraction peak of the main phase in X-ray diffraction between a crystallized glass material (a reference crystallized glass material), which is confirmed that, by means of an X-ray diffraction and thermal analysis, the amorphous region is not present after the heat treatment with a sufficiently high temperature is performed, and the crystallized glass material that is the subject to be measured.

Then, as shown in FIG. 6, the support members 12 and the sheet bodies 11 are stacked in alternating layers, while confining the current-collecting metal mesh. Thus, the state, in which the sheet bodies 11 and the support members 12 are stacked in alternating layers with the crystallized glass material interposed between the perimetric portion of the sheet body 11 and the perimetric portion of the support member 12 adjacent to the sheet body 11, is obtained.

Each of the metal meshes (the convex portion at the upper side of each metal mesh) and the adjacent air electrode layer 11c (the lower surface of the adjacent air electrode layer 11c) are bonded by means of an adhesive such as platinum, silver, silver alloy, conductive ceramic, etc. Each of the metal meshes (the convex portion at the lower side of each metal mesh) and the adjacent fuel electrode layer 11b (the upper surface of the adjacent fuel electrode layer 11b) are bonded by means of an adhesive such as platinum, silver alloy, nickel, nickel alloy, etc. Each of the metal meshes and the adjacent support member may be bonded by means of the above-mentioned adhesives, or may be bonded by using a technique such as a spot welding or diffusion bonding.

In order to reduce the warpage height h after the stacking step, the sheet body 11 and the support member 12 may be stacked while applying, to the sheet body 11, tensile force in the direction in which the perimetric portion is stretched in the plane direction. It is preferable that the warpage ratio is 0.03 $cm^{-1}$ or less after the completion of the stacking step, in order to achieve "the warpage ratio of 0.05 $cm^{-1}$ or less at room temperature after the reduction process" described below.

<Sealing Step>

Next, the resultant laminate is subject to a heat treatment, whereby the temperature of the laminate is kept to be a first temperature (e.g., 700° C.) for a predetermined time. As a result, the crystallization rate of the crystallized glass is increased to 0 to 50% as shown in FIG. 7. In the figure, the case in which the number of fine dots in the crystallized glass serving as the seal material 13 is greater indicates that the crystallization rate is large (the same is true for FIG. 8). Thus, the perimetric portion of the sheet body 11 and the perimetric portion of the support member 12 adjacent to the sheet body 11 are integrated and sealed (bonded). Consequently, each of the fuel channels 22 and each of the air channels 21 are airtightly formed and defined by the crystallized glass.

Further, the crystallization rate is kept to be 0 to 50%, so that an amorphous region is sufficiently left consciously in the crystallized glass. As a result, after the completion of the sealing process, the perimetric portion of the sheet body 11 and the perimetric portion of the support member 12 adjacent to the sheet body 11 are fixed to each other so as to make the relative movement impossible, when the temperature of the laminate is less than the softening point (lower than the crystallization temperature) of the crystallized glass. On the other hand, when the temperature of the laminate becomes not less than the softening point (lower than the crystallization temperature) of the crystallized glass afterward, the amorphous region is softened, whereby the state in which the perimetric portion of the sheet body 11 and the perimetric portion of the support member 12 adjacent to the sheet body 11 are restrained but can relatively move (to some degree) can be obtained. It is preferable that the warpage ratio assumes 0.03 $cm^{-1}$ or less after the completion of the stacking step, in order to achieve "the warpage ratio of 0.05 $cm^{-1}$ or less at room temperature after the reduction process" described below.

<Reduction Process Step>

Next, the laminate is again subject to a heat treatment, so that the temperature of the laminate is kept to be a second temperature (e.g., 800° C., which is higher than the first temperature) for a predetermined time. Simultaneously, a reduction gas (hydrogen gas in this embodiment) is introduced into the fuel channels 22.

With this heat treatment, the temperature of the laminate becomes not less than the softening point, whereby the state in which the perimetric portion of the sheet body 11 and the perimetric portion of the support member 12 adjacent to the sheet body 11 are restrained but can relatively move (to some degree) can be obtained. During when the state described above is obtained, the reduction process is performed to the fuel electrode layers 11b due to the introduction of the reduction gas, whereby, of NiO and YSZ constituting the fuel electrode layer 11b, NiO is reduced. As a result, the fuel electrode layer 11b becomes a Ni—YSZ cermet, thereby being capable of serving as a fuel electrode (anode electrode).

When the reduction process is performed to the fuel electrode layer 11b, the fuel electrode layer 11b contracts, with the result that the entire sheet body 11 also contracts as shown in FIG. 8 (refer to a black arrow in FIG. 8). As a result, the sheet body 11 receives tensile force, at its perimetric portion, in the direction along the plane direction from the adjacent support member 12 (the upper and lower support members). On the other hand, in the present embodiment, the reduction process is performed in the state in which the perimetric portion of the sheet body 11 and the perimetric portion of the support member 12 adjacent to the sheet body 11 are restrained but can make a relative movement (to some degree) as described above. Accordingly, even when the tensile force is applied from the support member 12 adjacent to the sheet body 11 due to the contraction of the sheet body 11 caused by the reduction process, it can be prevented that the tensile force becomes excessive.

Additionally, the fuel channel 22 and the air channel 21 are airtightly formed and defined by means of the crystallized glass at the current stage. Therefore, the supply of the reduction gas to the surface of the air electrode layer 21 during the reduction process can be prevented without taking a special measure for preventing the supply of the reduction gas to the surface of the air electrode layer 21.

In the reduction process step, the crystallization rate is sufficiently increased to 70 to 100% (the amorphous region is reduced) as shown in FIG. 8. Thus, the perimetric portion of the sheet body 11 and the perimetric portion of the support member 12 adjacent to the sheet body 11 are fixed by the crystallized glass in such a manner that they are difficult to make a relative movement regardless of temperature. Thus, the assembly of the fuel cell 10 is completed.

As described above, in the present embodiment, the reduction process to the fuel electrode layer 11b is executed by supplying the reduction gas into each fuel channel 22 in the state after the completion of the sealing step, i.e., in the state in which the perimetric portion of each sheet body 11 is "held" to be "sealed" by the lower surface of the perimetric portion of the upper support member 122 and the upper surface of the perimetric portion of the lower support member 121.

As a result, it has been found that "the warpage ratio of not more than 0.05 $cm^{-1}$ at room temperature after the reduction process" can be attained. As described above, "the warpage ratio of 0.05 $cm^{-1}$ or less at room temperature after the reduction process" cannot be achieved when the reduction process is executed in the state of the solitary sheet body that is extremely thin before the stacking. Specifically, this result is based upon the operation in which the action for inhibiting the progression of the warpage on the sheet body caused by the contraction of the fuel electrode layer 11b due to the reduction process is strongly exerted since the perimetric portion of each sheet body 11 is restrained (to some degree) by the "holding" and "sealing" described above under the conditions in which the thickness of each sheet body is extremely thin such as 20 μm or more and 500 μm or less, the thickness of the fuel electrode layer is greater than the thickness of the solid electrolyte layer and the thickness of the air electrode layer, and the area of the orthogonal projection of the plane portion of each support member is 1 cm² or more and 100 cm² or less.

More specifically described, when the fuel electrode layer 11b serves as the support layer of the sheet body 11 as in the present embodiment, strain stress is produced on the sheet body 11 due to the difference in the temperature at which the firing is started among the layers, the difference in the contraction and expansion amount during the firing among the layers, and the difference in the thermal expansion coefficient among the layers, upon the firing. When the sheet body is extremely thin as in the present embodiment, the warpage is inevitably produced on the sheet body 11 due to the strain stress. It has been found that, when the reduction process is performed to the fuel electrode layer 11b in the state in which the perimetric portion of each fired sheet body 11, which is extremely thin and has already been warped, is restrained to some degree, a sheet body 11 (having high flatness) having extremely small warpage ratio at room temperature can be obtained. This is considered that it is based upon the operation in which, during the process of reducing and firing NiO in the fuel electrode layer 11b to Ni, the extremely thin sheet body 11 is transformed with plastic strain. When the temperature of the stack having high temperature after the reduction process is lowered in a neutral atmosphere (in order not to reoxidize the sheet body 11), then, the resultant is collected, and then, a part of the support member (separator) 12 is cut to observe each sheet body 11 in which the perimetric portion thereof is restrained, the warpage at room temperature is reduced (compared to the fired sheet body before the reduction process). Even when the bonding portion between the perimetric portion of each sheet body 11 and the adjacent support member 12 is cut by a laser process so as to collect each sheet body 11 with a solitary state, the state in which the warpage is reduced at room temperature can be maintained. From the above, it is considered that, when the reduction process is performed to the fuel electrode layer 11b with the state in which the perimetric portion of the extremely thin sheet body 11 is restrained to some degree, the sheet body 11 is plastic-deformed, whereby the operation and effect of reducing the warpage of the sheet body 11 (flattening the sheet body 11) can be provided.

The result of the experiment conducted by changing the support layer (the layer having the greatest thickness among the three layers) of the sheet body will be described below. In this experiment, the shape and size of each member are the same as those in the above-mentioned embodiment, except for the distribution of the thickness of three layers constituting each sheet body. When the fuel electrode layer was formed to have the greatest thickness so as to serve as the support layer as in the present embodiment, "the warpage ratio became not more than 0.05 cm$^{-1}$ at room temperature after the reduction process". On the other hand, when the solid electrolyte layer was formed to have the greatest thickness so as to serve as the support layer, "the warpage ratio became 0.30 cm$^{-1}$ at room temperature after the reduction process", while when the air electrode layer was formed to have the greatest thickness so as to serve as the support layer, the sheet body was broken in most cases. This is considered to be based upon the operation that the support layer is made of a fragile porous ceramic. From the result of the experiment, it has been understood that, since the fuel electrode layer, which is the subject to which the reduction process is performed, is functioned as the support layer of the sheet body, the action for inhibiting the progression of the warpage on the sheet body caused by the contraction of the fuel electrode layer due to the reduction process is more strongly exerted.

Further, it has been found that the elastic force (preload, refer to white arrows in FIGS. 6 to 8) of the metal mesh for current collection confined in each fuel channel 22 and air channel 21 greatly contributes to the reduction in the "warpage after the reduction process". This is based upon the reason described below. Specifically, when the amount of the deformation of the sheet body 11 in the direction in which one of the upper and lower surfaces of the sheet body 11 (particularly, the central part of the sheet body 11) becomes convex gradually increases, the height of the metal meshes confined in one/the other side of the upper and lower surfaces of the sheet body 11 in the stacking direction decreases/increases according to the increase in the amount of deformation. With this, the elastic force of the metal meshes confined in one side/the other side respectively increases/decreases, so that the difference in the elastic force of the metal meshes confined in the one side/the other side increases. The difference in the elastic force exerts in the direction of reducing the amount of deformation. In this circumstance, the "warpage height h (warpage ratio) after the reduction process" is decreased more in case where the metal mesh is confined as described above than in case where the metal mesh is not confined.

The preferable range of the elastic coefficient (the ratio of the change of the elastic force to the change in the height of the metal mesh in the stacking direction within the elastic region) of the metal mesh in the stacking direction will be described next. The elastic coefficient of the metal mesh is preferably 0.1 to 8 N/μm for the size of the fuel cell 10 in the above-mentioned embodiment. With this structure, it has been found that the electrical connection between the support member 12 and the sheet body 11, which are adjacent to each other, is surely secured, and the generation of cracks on the sheet body 11 during the reduction process step can be prevented.

The experiment conducted for confirming this operation will be described below. In the experiment, a sheet body of a fuel-electrode-support-type (the fuel electrode layer serves as a support substrate) was used. This sheet body is square having one side of 30 mm as viewed in plane, and includes an electrolyte layer (thickness: 3 μm) made of 8YSZ, a fuel electrode layer (thickness: 150 μm) made of NiO-8YSZ, and an air electrode layer (thickness: 15 μm) made of LSCF, those layers being stacked. Three-layer stacks were manufactured in the stacking step by using this sheet body. The experiment was conducted with the use of the three-layer stacks.

The elastic coefficient of the metal mesh can optionally be adjusted in accordance with the specification of the mesh (e.g., wire diameter of a mesh material, a shape of an embossed portion, an arrangement pitch of an embossed portion, etc.). The three-layer stack was assembled with the metal mesh, which is shaped, bonded to the side of the support member (by a diffusion bonding, or spot welding).

TABLE 1

| Standard | Elastic coefficient (N/μm) | Output density (mW/cm²) | Result |
|---|---|---|---|
| 1 | 0.05 | 430 | X (Output density was reduced) |
| 2 | 0.1 | 750 | ◯ |
| 3 | 1.0 | 778 | ◯ |
| 4 | 2.5 | 812 | ◯ |
| 5 | 5.0 | 820 | ◯ |

TABLE 1-continued

| Standard | Elastic coefficient (N/μm) | Output density (mW/cm$^2$) | Result |
|---|---|---|---|
| 6 | 7.0 | 790 | ○ |
| 7 | 8.0 | 822 | ○ |
| 8 | 9.0 | Evaluation impossible | X (Cracks generated on sheet body) |

Table 1 shows the result when a series of the stacking step, the sealing step, and the reduction process step was repeated while changing the elastic coefficient of the metal mesh. The elastic coefficient of the metal mesh at the fuel electrode side and the elastic coefficient of the metal mesh at the air electrode side were made equal to each other. The elastic coefficient of the metal mesh at the fuel electrode side and the elastic coefficient of the metal mesh at the air electrode can individually be made appropriate. Whether the sheet body was broken or not was evaluated by measuring the balance of the gas flow rate to the stack. Whether the electrical connection was secured or not was evaluated by measuring the output density of the stack at working temperature of 700° C. and rating of 0.7 V.

As shown in Table 1, it was found that, when the elastic coefficient of the metal mesh was greater than 8 N/μm, the cracks were easy to be generated on the sheet body 11 during the reduction process. This is based upon the operation described below. Specifically, when the elastic coefficient is great, the amount of change (the amount of change of the difference in the elastic force) of the elastic force of the metal mesh to the change in the amount of deformation of the sheet body 11 caused during the reduction process is increased, with the result that the portion in the sheet body 11 where the stress becomes locally excessive is likely to be produced.

On the other hand, it was found that, when the elastic coefficient of the metal mesh was less than 0.1 N/μm, the output density of the stack was decreased. This is considered on the basis of the operation described below. Specifically, when the elastic coefficient is small, the preload of the metal mesh is decreased, with the result that the poor contact is likely to occur at the contact portion (contact point) between the metal mesh and the support member 12 or the sheet body 11.

On the other hand, when the elastic coefficient of the metal mesh is within the range of 0.1 to 8 N/μm, the output density of the stack is not reduced, and further, the cracks are not generated on the sheet body 11 during the reduction process step. From the above, the elastic coefficient of the metal mesh is preferably within the range of 0.1 to 8 N/μm, for the fuel cell 10 having the size described above.

As described above, in the assembling method of the solid oxide fuel cell 10 having a (flat-plate) structure in which the sheet body (single cell), which is a fired body of the solid electrolyte layer, fuel electrode layer, and air electrode layer, and the support member (separator) are stacked in alternating layers, the sheet body 11 and the support member 12 are firstly stacked in alternating layers with the crystallized glass material interposed between the perimetric portion of the sheet body 11 and the perimetric portion of the support member 12 adjacent to the sheet body 11 in the stacking step. Then, in the sealing step, the resultant laminate is heated to a first temperature (e.g., 700° C.) so as to increase the crystallization rate of the crystallized glass to 0 to 50%. With this process, the perimetric portion of the sheet body 11 and the perimetric portion of the support member 12 adjacent to the sheet body 11 are integrated and sealed. Next, in the reduction process step, the resultant laminate is heated to a second temperature (e.g., 800° C., >first temperature) and a reduction gas is supplied into the fuel channel 22 so as to increase the crystallization rate of the crystallized glass to 70 to 100% and to perform the reduction process to the fuel electrode layer 11b.

As described above, the reduction process is performed to the fuel electrode layer 11b by supplying the reduction gas into each fuel channel 22 in the state after the completion of the sealing step, i.e., in the state in which the perimetric portion of the sheet body 11 is restrained (to some degree), since the perimetric portion of the sheet body 11 is held to be sealed by the lower surface of the perimetric portion of the upper support member 122 and the upper surface of the perimetric portion of the lower support member 121.

As a result, "the warpage ratio of not more than 0.05 cm$^{-1}$ at room temperature after the reduction process" can be achieved in the small-sized fuel cell 10 in which the thickness of the sheet body 11 is 20 μm or more and 500 μm or less, the thickness of the fuel electrode layer is greater than the thickness of the solid electrolyte layer and the thickness of the air electrode layer, and the area of the orthogonal projection of the plane portion 12a of each support member 12 is 1 cm$^2$ or more and 100 cm$^2$ or less.

The present invention is not limited to the above-described embodiment, but can be modified in various other forms without departing from the scope of the present invention. In the above-described embodiment, the fuel electrode layer 11b can be formed from, for example, platinum, platinum-zirconia cermet, platinum-cerium-oxide cermet, ruthenium, or ruthenium-zirconia cermet.

Also, the air electrode layer 11c can be formed from, for example, lanthanum-containing perovskite-type complex oxide (e.g., lanthanum cobaltite, in addition to the above-mentioned lanthanum manganite). Lanthanum cobaltite and lanthanum manganite may be doped with strontium, calcium, chromium, cobalt (in the case of the lanthanum manganite), iron, nickel, aluminum, or the like. Also, the air electrode layer 11c may be formed from palladium, platinum, ruthenium, platinum-zirconia cermet, palladium-zirconia cermet, ruthenium-zirconia cermet, platinum-cerium-oxide cermet, palladium-cerium-oxide cermet, or ruthenium-cerium-oxide cermet.

In the above-mentioned embodiment, the sheet body 11 and the separator 12 have a planar shape of square. However, the sheet body 11 and the separator 12 may have a planar shape of rectangle, circle, ellipse, etc.

What is claimed is:

1. A solid oxide fuel cell comprising:
    a single or a plurality of sheet bodies including a solid electrolyte layer, a fuel electrode layer formed on the upper surface of the solid electrolyte layer, and an air electrode layer formed on the lower surface of the solid electrolyte layer, these layers being stacked and fired; and
    a plurality of support members for supporting the single or the plurality of sheet bodies, wherein the sheet bodies and the support members are stacked in alternating layers, wherein
    for each sheet body, an upper surface of a perimetric portion of the fuel electrode layer of the sheet body and a lower surface of a perimetric portion of an upper support member, which is the support member adjacent to the upper side of the sheet body, as well as a lower surface of a perimetric portion of the air electrode layer of the sheet body and an upper surface of the perimetric portion of a lower support member, which is the support member adjacent to the lower side of the sheet body, are respectively sealed through an interposed seal material so that the upper surface of the perimetric portion of the fuel electrode layer and the lower surface of the perimetric portion of the air electrode layer of each sheet body are in direct contact with the interposed seal material and the perimetric portion of each sheet body is secured between both the lower surface of the perimetric portion of the upper support member and the upper surface of the perimetric portion of the lower support member, with remaining central portions of the upper and lower surfaces of the sheet body being spaced from remaining central portions of the upper and lower support members, and for each sheet body, a fuel channel through which a fuel gas is supplied is defined and formed in a space formed between a lower surface of a plane portion located at the inner side from the perimetric portion of the upper support member and the upper surface of the fuel electrode layer in the sheet body, and an air channel through which a gas containing oxygen is supplied is defined and formed in a space formed between an upper surface of a plane portion located at the inner side from the perimetric portion of the lower support member and the lower surface of the air electrode layer in the sheet body, wherein the thickness of each sheet body is 20 μm or more and 500 μM or less, the thickness of the fuel electrode layer is greater than the thickness of the solid electrolyte layer and the thickness of the air electrode layer, the area of an orthogonal projection of the plane portion of each support member with respect to the direction perpendicular to the plane of the sheet body is 1 cm² or more and 100 cm² or less, and a warpage ratio, which is a ratio of a height of a warpage of each sheet body in the direction perpendicular to the plane portion to the area of the orthogonal projection of the plane portion, is 0.05 cm$^{-1}$ or less, under room temperature after the execution of a reduction process to each of the fuel electrode layers.

2. The solid oxide fuel cell according to claim 1, wherein the shape of the orthogonal projection of the plane portion of the support member is formed into a circle, ellipse, square, or rectangle, and the diameter of the circle, the major axis of the ellipse, one length of the square, or the length of the long side of the rectangle is 1 cm or more and 10 cm or less.

3. The solid oxide fuel cell according to claim 1, wherein the reduction process to each fuel electrode layer is executed by supplying a reduction gas into the fuel channel, in a state in which the perimetric portion of each sheet body is held to be sealed by the lower surface of the perimetric portion of the upper support member and the upper surface of the perimetric portion of the lower support member.

4. The solid oxide fuel cell according to claim 1, wherein for each sheet body, a current-collecting member for securing an electrical connection between the support member and the sheet body, with the support member and the sheet body being adjacent to each other, is confined in each of the corresponding fuel channel and the corresponding air channel, wherein each of the current-collecting members has an elasticity in the direction perpendicular to the plane of the sheet body, and each current-collecting member is provided in such a manner that an elastic force to keep the support member and the sheet body away from each other in the perpendicular direction is produced, wherein the elastic coefficient relating to the elasticity of each of the current-collecting members is within the range of 0.1 to 8 N/μm.

5. The solid oxide fuel cell according to claim 1, wherein the perimetric portion of the sheet body is sealed and held to the perimetric portions of the upper and lower support members by a crystallized glass material.

6. The solid oxide fuel cell according to claim 1, wherein the remaining central portions of the upper and lower support members are arranged in two parallel planes.

7. The solid oxide fuel cell according to claim 1, wherein all of the layers of each sheet body are in direct contact with one another.

8. The solid oxide fuel cell according to claim 7, wherein the direct contact is along the entire length of each sheet body.

9. An assembling method of a solid oxide fuel cell including:

a single or a plurality of sheet bodies including a solid electrolyte layer, a fuel electrode layer formed on the upper surface of the solid electrolyte layer, and an air electrode layer formed on the lower surface of the solid electrolyte layer, these layers being stacked and fired; and a plurality of support members for supporting the single or the plurality of sheet bodies, wherein the sheet bodies and the support members are stacked in alternating layers, wherein for each sheet body, an upper surface of a perimetric portion of the fuel electrode layer of the sheet body and a lower surface of a perimetric portion of the upper support member, which is the support member, as well as a lower surface of a perimetric portion of the air electrode layer of the sheet body and an upper surface of the perimetric portion of the lower support member, which is the support member, are respectively sealed through an interposed seal material so that the upper surface of the perimetric portion of the fuel electrode layer and the lower surface of the perimetric portion of the air electrode layer of each sheet body are in direct contact with the interposed seal material and the perimetric portion of each sheet body is secured between both the lower surface of the perimetric portion of the upper support member and the upper surface of the perimetric portion of the lower support member, with remaining central portions of the upper and lower surfaces of the sheet body being spaced from remaining central portions of the upper and lower support members, and for each sheet body, a fuel channel through which a fuel gas is supplied is defined and formed in a space formed between a lower surface of a plane portion located at the inner side from the perimetric portion of the upper support member and the upper surface of the fuel electrode layer in the sheet body, and an air channel through which a gas containing oxygen is supplied is defined and formed in a space formed between the upper surface of the plane portion located at the inner side from the perimetric portion of the lower support member and the lower surface of the air electrode layer in the sheet body, wherein the thickness of each sheet body is 20 μm or more and 500 μm or less, the thickness of the fuel electrode layer is greater than the thickness of the solid electrolyte layer and the thickness of the air electrode layer, the area of an orthogonal projection of the plane portion of each support member with respect to the direction perpendicular to the plane of the sheet body is 1 cm² or more and 100 cm² or less, the method comprising:

a stacking/sealing step in which the sheet bodies and the support members are stacked in alternating layers with the interposed seal material between the perimetric portion of each of the sheet bodies and the perimetric portion of each of the support members adjacent to the sheet body, and the perimetric portion of each of the sheet bodies is held to be sealed by the lower surface of the perimetric portion of the upper support member and the upper surface of the perimetric portion of the lower support member; and a reduction process step in which a reduction gas is supplied into the fuel channel formed and defined in the resultant laminate, which has been subject to the sealing, in order to perform a reduction process to the fuel electrode layer, wherein a warpage ratio, which is a ratio of a height of a warpage of each sheet body in the direction perpendicular to the plane portion to the area of the orthogonal projection of the plane portion, is 0.05 $cm^{-1}$ or less, under room temperature after the execution of the reduction process to each of the fuel electrode layers.

10. The assembling method of a solid oxide fuel cell according to claim 9, wherein in the stacking/sealing step, a current-collecting member for securing an electrical connection between the support member and the sheet body, which are adjacent to each other, is confined in each space corresponding respectively to the fuel channel and the air channel between the sheet body and the support member, which are adjacent to each other, in order to secure the electrical connection between the support member and the sheet body, which are adjacent to each other.

11. The assembling method of a solid oxide fuel cell according to claim 9, wherein the perimetric portion of the sheet body is sealed and held to the perimetric portions of the upper and lower support members by a crystallized glass material.

12. The assembly method of a solid oxide fuel cell according to claim 9, wherein the remaining central portions of the upper and lower support members are arranged in two parallel planes.

* * * * *